United States Patent
Wu et al.

(10) Patent No.: US 9,076,238 B2
(45) Date of Patent: Jul. 7, 2015

(54) INTELLIGENT WEIGHTED BLENDING FOR ULTRASOUND IMAGE STITCHING

(71) Applicant: Seiko Epson Corporation, Tokyo (JP)

(72) Inventors: Chenyu Wu, Sunnyvale, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 44 days.

(21) Appl. No.: 13/971,895

(22) Filed: Aug. 21, 2013

(65) Prior Publication Data
US 2015/0055839 A1 Feb. 26, 2015

(51) Int. Cl.
G06T 5/50 (2006.01)
G06T 7/00 (2006.01)

(52) U.S. Cl.
CPC ......... G06T 5/50 (2013.01); G06T 2207/20221 (2013.01); G06T 2207/10132 (2013.01); G06T 7/0012 (2013.01); G06T 7/004 (2013.01)

(58) Field of Classification Search
CPC .............................. G06T 7/0012; G06T 7/004
USPC ................................................. 382/128, 131
See application file for complete search history.

(56) References Cited

U.S. PATENT DOCUMENTS

| 5,956,418 | A * | 9/1999 | Aiger et al. ................ 382/154 |
| 6,486,908 | B1 * | 11/2002 | Chen et al. ..................... 348/39 |
| 6,999,100 | B1 | 2/2006 | Leather et al. |
| 7,837,624 | B1 * | 11/2010 | Hossack et al. ............. 600/443 |
| 7,894,689 | B2 * | 2/2011 | Liu et al. ...................... 382/284 |
| RE43,206 | E * | 2/2012 | Hsieh et al. .................. 382/284 |
| 8,319,823 | B2 | 11/2012 | Chen et al. |
| 8,345,961 | B2 * | 1/2013 | Li et al. ........................ 382/154 |
| 2006/0072852 | A1 * | 4/2006 | Kang et al. ................... 382/294 |
| 2006/0187234 | A1 * | 8/2006 | Deng et al. ................... 345/592 |
| 2009/0156933 | A1 * | 6/2009 | Gerard et al. ................ 600/443 |
| 2010/0194851 | A1 * | 8/2010 | Pasupaleti et al. ............. 348/36 |
| 2011/0142350 | A1 * | 6/2011 | Tang et al. .................... 382/195 |
| 2012/0308126 | A1 * | 12/2012 | Hwang et al. ................ 382/165 |
| 2013/0039567 | A1 * | 2/2013 | Choi et al. .................... 382/154 |
| 2013/0335596 | A1 * | 12/2013 | Demandolx et al. ..... 348/231.99 |

(Continued)

FOREIGN PATENT DOCUMENTS

EP 1531730 5/2005

OTHER PUBLICATIONS

Generating Panorama Photos, Yining Deng and Tong Zhang, Hewlett-Packard Labs, Palo Alto, Aug. 21, 2003.

(Continued)

Primary Examiner — Kim Vu
Assistant Examiner — Molly Delaney

(57) ABSTRACT

Ultrasound images are stitched together by extracting target image regions within each ultrasound image, identifying interest points for the extracted target images and then identifying interest point correspondences between the interest points of all the extracted target image regions. The interest point correspondence is used to define a common, word coordinate for all extracted target images, and the extracted target images are warped onto the world coordinates. A distance weight, w1, gradient weight w2, and histogram weight w3 is then determined for each pixel of the warped, target images. The three weights are then combined and normalized across all the warped, target images. The combined, normalized weights are used in the blending and stitching of the warped, target images.

9 Claims, 17 Drawing Sheets

(56) References Cited

U.S. PATENT DOCUMENTS

2014/0152762 A1* 6/2014 Ukil et al. .................. 348/36
2014/0301627 A1* 10/2014 Dean et al. .................. 382/141

OTHER PUBLICATIONS

Image Stitching, Computer Vision, Richard Szeliski, Microsoft Research, Spring 2008.

Rapid Image Stitching and Computer-Aided Detection for Multipass Automated Breast Ultrasound, Ruey-Feng Chang, Kuang-Che Chang-Chien, Etsuo Takada, Chiun-Sheng Huang, Yi-Hong CHou, Chenming Kuo, Jeon-Hor Chen, May 2010, (pp. 1-11).

Ultrasound Volume Stitching, Christian Wachinger, Wolfgang Wein, Nassir Navab, Computer Aided Medical Procedures (CAMP), TUM, Munich, Germany, Oct. 2007.

* cited by examiner

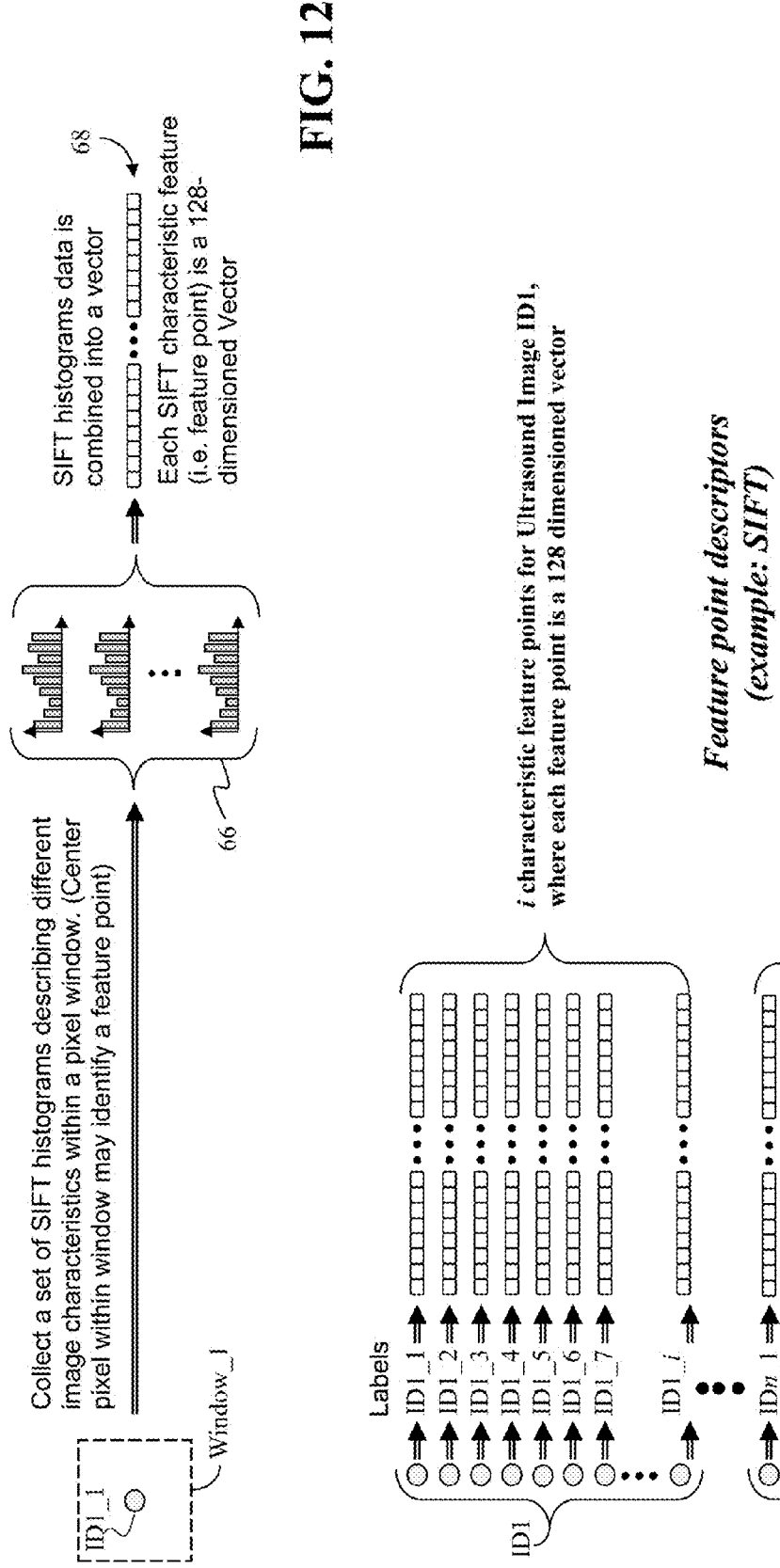

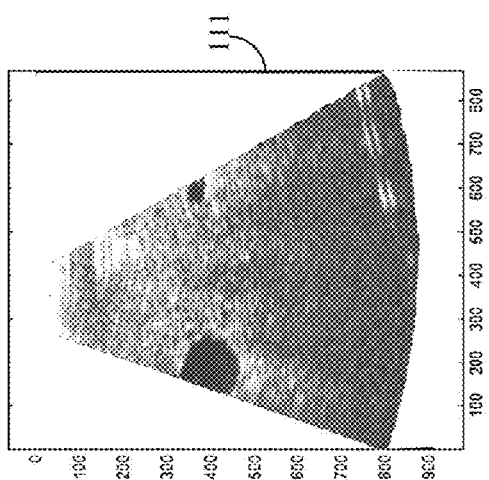
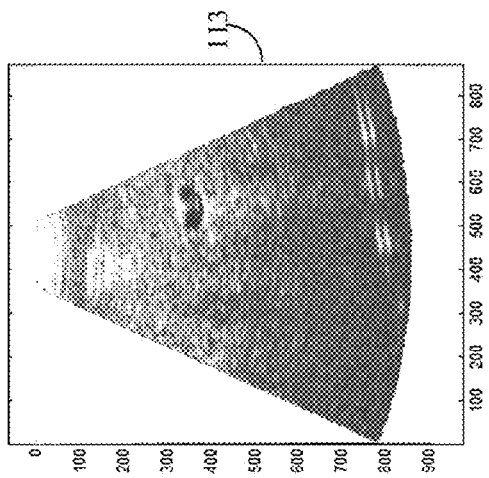
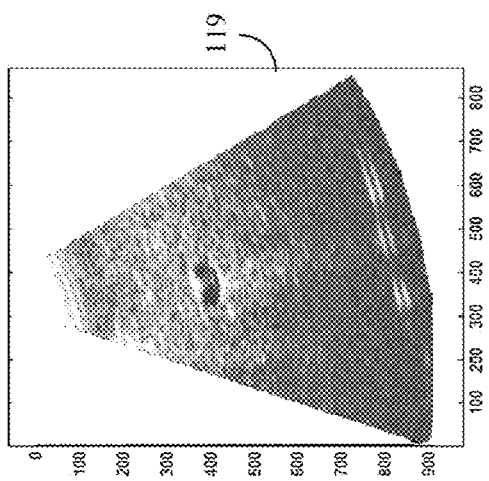
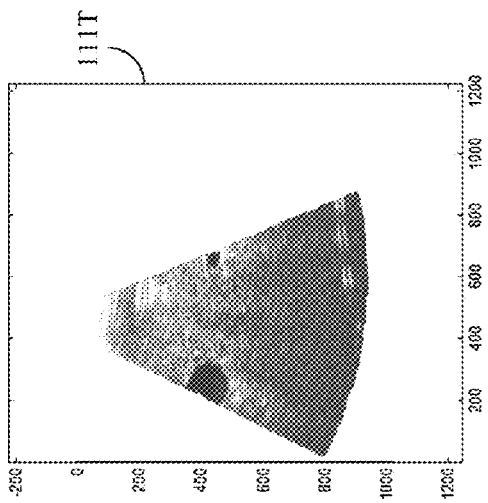
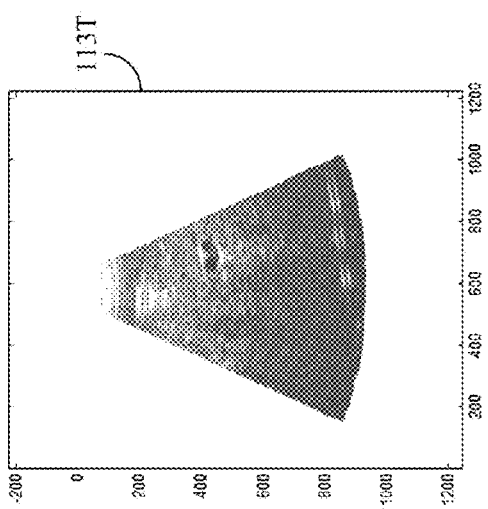
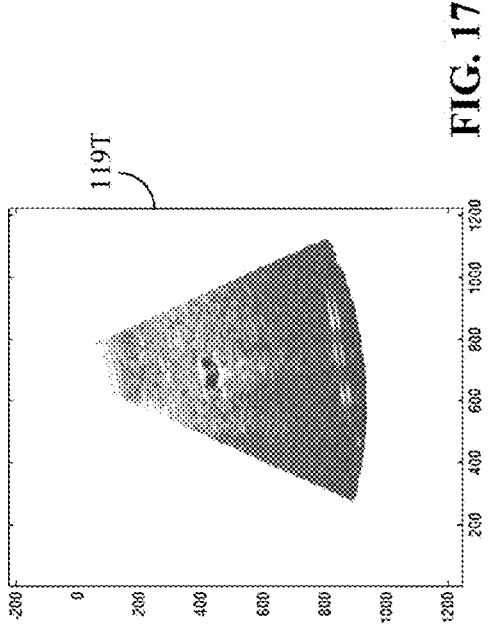
FIG. 17

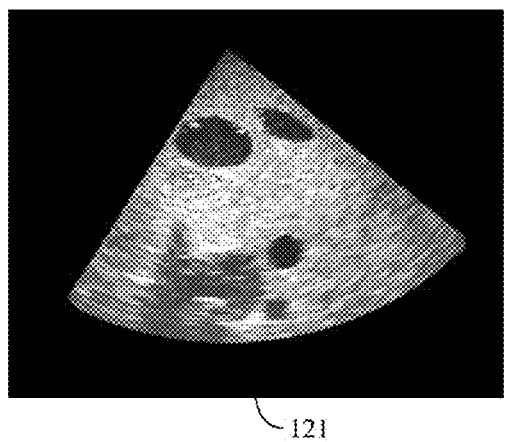 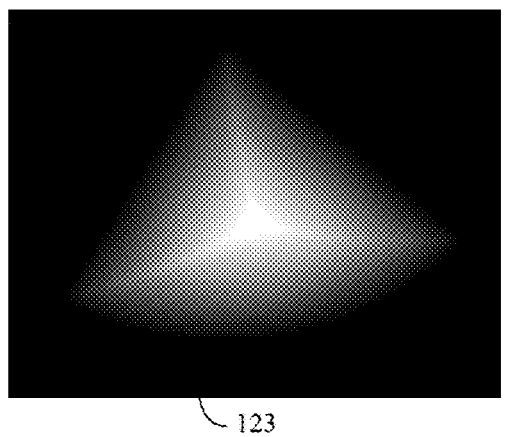
121  123
FIG. 18
 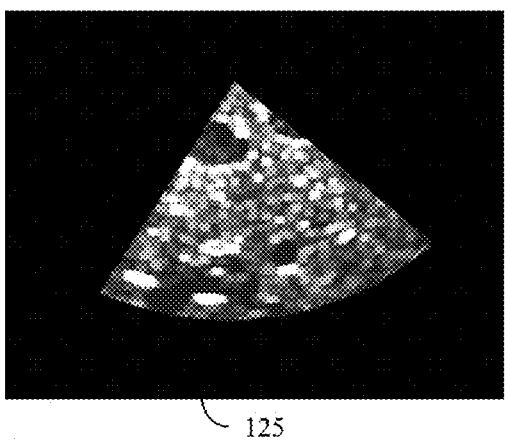
121  125
FIG. 19
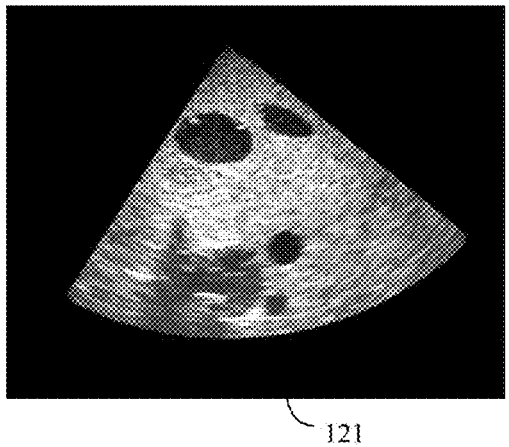 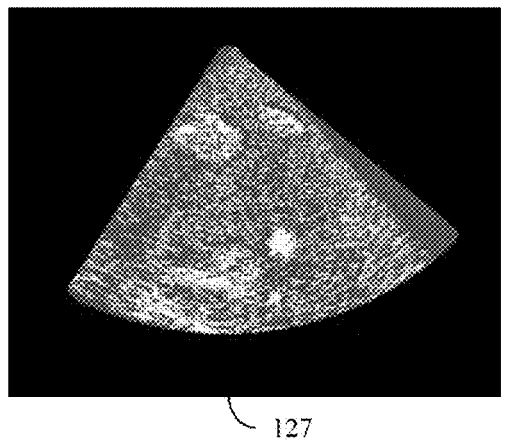
121  127
FIG. 20

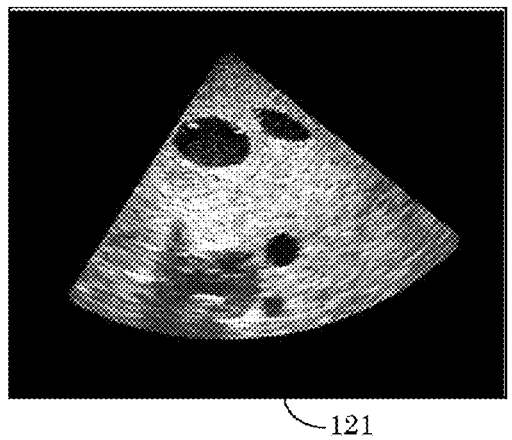 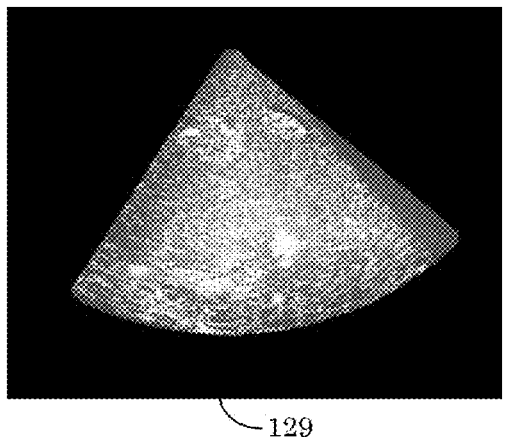
FIG. 21
 
FIG. 23
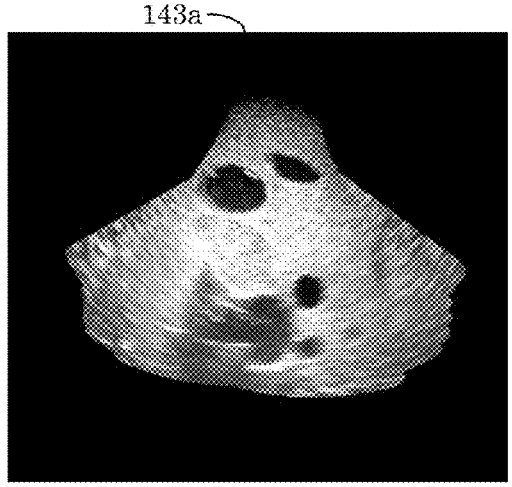 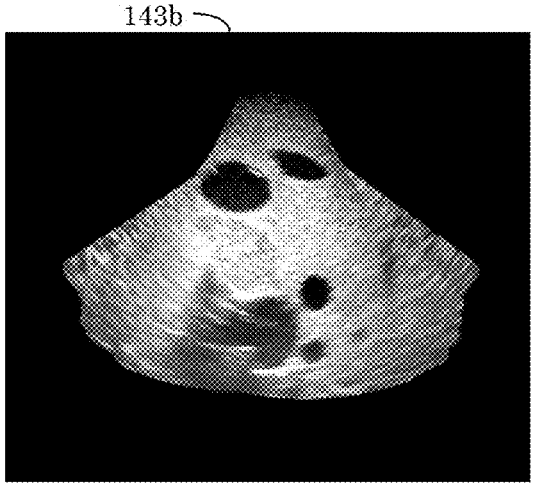
FIG. 24

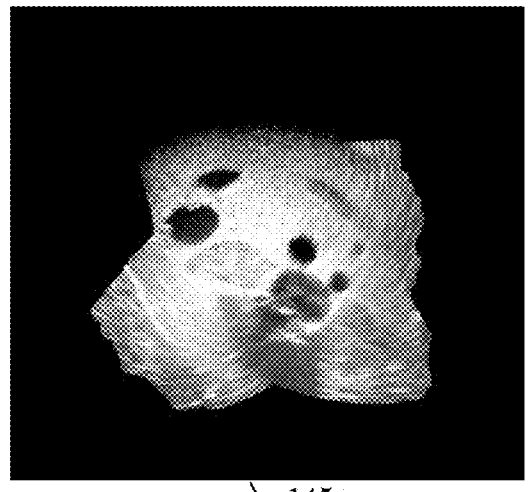
145a
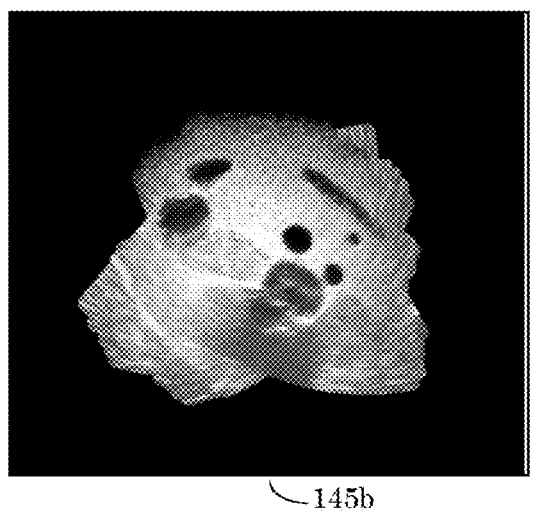
145b
FIG. 25
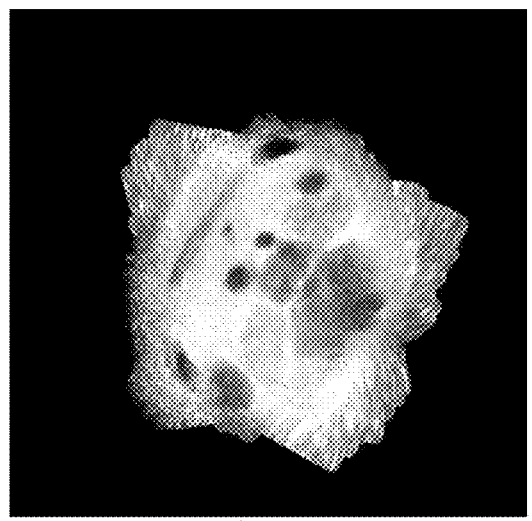
147a
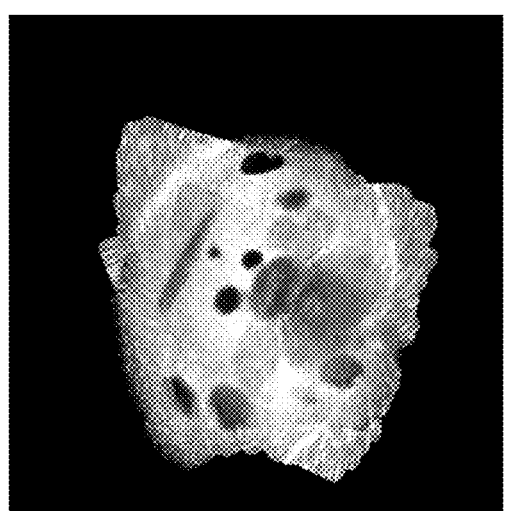
147b
FIG. 26

INTELLIGENT WEIGHTED BLENDING FOR ULTRASOUND IMAGE STITCHING

BACKGROUND

1. Field of Invention

The present invention relates to the field of ultrasound imaging. More specifically, it relates to the stitching together of multiple ultrasound images.

2. Description of Related Art

Ultrasound imaging refers to the imaging of structures below a subject's surface (such as the imaging of internal human organs below a skin surface) by the sending of sound waves of known frequency into the interior of the subject and observing any sound waves that bounce back. By monitoring how long it takes for sound waves to bounce back from an internal structure, it is possible to estimate the depth and shape of the structure within the subject. It is also possible to discern some characteristics about the internal structure based on how the sound waves are absorbed, dispersed or deflected.

Ultrasonography, or diagnostic sonography, refers to the use of ultrasound imaging techniques for imaging subcutaneous body structures, or tissues, for diagnostic purposes. Ultrasound imaging may be used to image various types of tissues, such as muscle, fat, tendons, vessels, internal organs, etc. Another example is obstetric sonography, which is used to image a developing baby during pregnancy.

Ultrasound imaging typically applies a series of ultrasound waves at a frequency above the human audible range, and observed the sound waves that bounce back. Each sound wave is observed separately and constitutes a scan signal, or a scan line of an image. The collection of observed sound waves, or scan lines or scan signals, are placed sequentially next to each other to construct a two-dimensional image, in a manner similar to how images are created in cathode ray tube.

A problem with ultrasound images is that they are typically very noisy, due in part to the great many tissues and fluids of differing densities and types encountered by a sound wave as it propagates and dissipates through its downward and upward paths through an observed body.

Another problem with ultrasound images is that they are constructed by moving an ultrasound wand over the surface of a target tissue area, but the resultant ultrasound image formed from one pass of the ultrasound wand is typically very narrow. This provides a user (i.e., an ultrasound technician) with only a small observable part (or swatch or slice) of the whole of the target tissue area. As a result, multiple swatches are typically needed to gather enough imaging information to span the whole of the target area. That is, a technician must make multiple passes with the ultrasound wand, store the image information from each pass, and try to put together the image information from the different passes.

The ability to stitch together multiple ultrasound images from multiple passes to create on larger ultra sound image is therefore beneficial. To stitch images together refers to the combining of image information from two or more images as seamlessly as possible/practical. Much has been written in the field of stitching digital camera images to create panoramic views, but many of the techniques used to stitch digital camera images rely on the images being of good quality. Unfortunately, ultrasound images are very noisy and often "dark", which limits the application of typical image stitching techniques. Another difficulty is that ultrasound images are not two-dimensional arrays of pixels, as is the case of digital camera images, but are rather individual, one-dimensional, scan lines that are typically processed individually. This further limits the porting of image stitching techniques from the field of digital camera imaging systems to the field of ultrasound imaging systems.

Nonetheless, there are several examples of stitching ultrasound images. One example is found in European patent EP1531730A1 to Chin et al, which describes the stitching of multiple ultrasound images to construct a composite whole for aid in the diagnosis of breast cancer. Another example is provided in "Rapid Image Stitching and Computer-Aided Detection for Multipass Automated Breast Ultrasound", Med. Phys. 37 (5), May 2010, by Chang et al., which describes using the sum of absolute block-mean difference (SBMD) measure to stitch ultrasound images.

Stitching multiple ultrasound images has some self-evident advantages, but image stitching in general (such as that used in digital camera images) is an independent field of study. For example, images of a scene may be stitched together to create a paranormal view, as is described in "Generating Panorama Photos", Proc. of SPIE Internet Multimedia Management Systems IV, vol. 5242, ITCOM, Orlando, September 2003, by Deng et al. Another example of image stitching is found in U.S. Pat. No. 8,319,823 to Chen et al.

In general, image stitching requires two more adjacent images having some overlapping portion. Characteristic features of each image (at least within their overlapping portions) are identified and described. The distinctive descriptions of the characteristic features in one image are then compared with those of its adjacent image to identify characteristic features that may correspond to each other (and thus correspond to the same point on an imaged scene). Characteristic features that correspond to each other may be said to be "indexed" to each other. In this manner, an index of corresponding (i.e. matched or correlated) characteristic features in the overlapping portions can be established, and this indexing is then used to align and stitch together the two images.

For example in FIG. 1, images 7A, 7B, 7C and 7D each provide partial, and overlapping, views of a building in a real-world scene, but none provide a full view of the entire building. However, by applying characteristic feature detection and indexing (i.e. identifying matching pairs of) characteristic features in the four partial images 7A, 7B, 7C and 7D that correlate to the same real feature point in the real-world scene, it is possible to stitch together the four partial images to create one composite image 7E of the entire building.

Preferably, the characteristic features are uniquely recognizable and distinctively describable. The characteristic features may includes edges, corners, blobs (or regions) and/or individual pixels (i.e. points). When the characteristic features are corners, they are often termed "interest points". The Harris corner detector is a well-known mechanism/method for identifying interest points (i.e. characteristic corners). When the characteristic features are individual points, such as individual pixels, they are often termed "feature points". The SIFT (or affine SIFT) algorithm is a well-known mechanism/method for identifying feature points. It noted that a corner is a point (i.e. a pixel) and although the Harris corner detector was initially developed to find corners, it was soon realized that the definition of "corner" permitted it to uniquely identify individual points (i.e. pixels). Thus, like the SIFT algorithm, the Harris corner detector also uniquely identifies/describes individual distinctive pixels, but may be more selective than the SIFT algorithm since it limits itself to pixels having characteristics distinctive of corners. It is further noted that the individual points identified by the Harris corner detector are still commonly termed "interest points" instead of "feature point" for historical reasons. Nonetheless, both algorithms are popular and well-known methods of identifying characteristic features (i.e. interest points and feature points).

In the present discussion, however, the terms "interest point" and "feature point" will be used interchangeably to generally refer to a characteristic feature, or a point of interest, i.e. an image point that can be distinctively identified and described within an image (or within a window area within an image). Thus, interest point and feature point may both refer to a characteristic pixel within an image.

Because ultrasound images are generally narrow, and multiple overlapping imaging passes of an ultrasound wand are required to span the breath of a target object of observation, it is an object of the present invention to provide automated stitching of the many overlapping ultrasound images.

It is also an object of the present invention that the automated method be robust enough not to be confused by the large amount of noise found in ultrasound images.

Since the ultrasound images may be taken in any direction that the ultrasound imaging wand is moved, a further object of the present invention is that the automated system be capable of automatically identifying the overlapping portions of the different images and automatically orient the different image correctly for stitching.

It is a further object of the present invention that the automated stitching system post-process the stitched image so as to produce relatively seamless stitching with consistent imaging tones across the composite, stitched image.

SUMMARY OF INVENTION

The above objects are met in a system, or method, for stitching multiple overlapping ultrasound images to create a composite, larger ultrasound image. The method may be divided into a pre-processing stage and an image stitching stage.

In the pre-processing stage, for each ultrasound image, an image region smaller than the whole ultrasound image is extracted. The present invention will stitch together the extracted image regions from the multiple ultrasound images, rather than stitch the whole of the ultrasound images. Preferably, each image region defines an area of interest (i.e. the portion of an ultrasound image showing the internal organs under study). This can be achieved by detecting the corners of the area of interest, and connecting these corners to form a perimeter of the region to be extracted. Points of interest, or feature points, are then detected within the extracted regions and correlated to each other. That is, corresponding feature points in the multiple image regions (i.e. in the overlapping portions of the ultrasound images) are correlated (i.e. indexed) to each other. The images can then be warped onto a defined "world coordinates" (i.e. a coordinate system common to all extracted image regions).

Each ultrasound image is comprised of a series of scan lines. But the image stitching stage processes each ultrasound image as a whole, or unit, rather than as a series of scan lines. The stitching stage also defines three weights for each ultrasound image.

The first weight is a "distance weight" w1, where pixels closer to the center of each image region receive higher weights.

The second weight is a "gradient weight" w2 by magnitude, where pixels having a higher gradient (i.e. a higher measure of the difference in its brightness relative to its surrounding pixels) receive a higher weight value.

The third weight is a "histogram weight" w3 of the intensity of each image pixel across all image regions (i.e. all ultrasound images). That is, a composite histogram of the normalized intensity values of all the pixels in all stitched ultrasound image regions is computed, and the weight value assigned to each pixel is determined by its distribution (i.e. position) within the composite histogram.

The images are then stitched by a blending function that combines the three weights. Across each image region to be stitched, its three weights are normalized; indicated by notation Norm(w1), Norm(w2) and Norm(3). The normalized weights have values ranging from 0 to 1 so that they can be directly combined at each pixel by the following relationship: w=Norm(w1)+Norm(w2)+2*Norm(w3).

The present invention is embodied in a method of stitching together a respective image region from each of a plurality of input images, comprising: detecting feature points in each image region, and identify candidate corresponding feature points among the image regions, reject incorrect correspondences among the candidate corresponding feature points to define corresponding features points; warping the corresponding feature points onto a defined world coordinates spanning the image regions; For each of the image regions, (a) defining a first weight, i.e. w1, as a "distance weight" wherein each pixel is assigned a distance weight dependent upon its proximity to an edge of its respective image region; (b) defining a second weight, i.e. w2, as a "gradient weight" wherein pixels having a higher gradient, i.e. difference in intensity value as compared to neighboring pixels, receiving a higher weight value; (c) defining a third weight, i.e. w3, as a "histogram weight" of the intensity of each pixel across all image regions, stitching the respective image regions by a blending function applied to overlapping areas of the image regions, wherein in the blending function, across each image region to be stitched, its three weights are normalized to weight values from 0 to 1, to define a first normalized weight, i.e. Norm(1), a second normalized weight, i.e. Norm(w2) and a third normalized weight, i.e. Norm(w3), and overlapping regions are combined by the following relationship: w=Norm(w1)+ Norm(w2)+2*Norm(w3).

Preferably, only one image region from each respective input image is extracted, each image region being a fraction of its respective input image. In this case, the input images are constructed by an ultrasound imaging means and the image region within each input image define an ultrasound constructed image. Additionally within each input image, its corresponding image region is extracted by identifying corners defining the image region. It is preferred that the input images are at least three input image images.

Further preferably, in determining the first weight, pixels closer to the center of their respective image region receive higher weights than pixels more distant from the center.

Additionally in defining the third weight includes, defining a normalized intensity histogram of the corresponding pixels in all image regions, and determining the third weight value of each pixel based on the count of its intensity in the histogram.

Preferably, the candidate corresponding feature points are identified by rotation-invariant template matching.

Additionally, incorrect correspondences among the candidate corresponding feature points are identified by means of a RANSAC algorithm.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIGS. 12 and 13 provide an overview of the feature point extraction function of SIFT.

FIG. 17 illustrates the rigid transformation between adjacent image areas.

FIG. 18 illustrates a distribution of Distance weights w1.

FIG. 19 illustrates a gradient weight distribution of Gradient weights w2.

FIG. 20 illustrates a Histogram weight distribution of Histogram weights w3.

FIG. 21 illustrates an example of the combining of the three weights for an input image.

FIG. 23 compares the stitching of three image regions using only a distance weight versus using the normalized three weights of the present invention.

FIG. 24 compares the stitching of six image regions using only a distance weight versus using the normalized three weights of the present invention.

FIG. 25 compares the stitching of six image regions using only a distance weight versus using the normalized three weights of the present invention.

FIG. 26 compares the stitching of seventy-two image regions using only a distance weight versus using the normalized three weights of the present invention.

DESCRIPTION OF THE PREFERRED EMBODIMENTS

Figure 1:
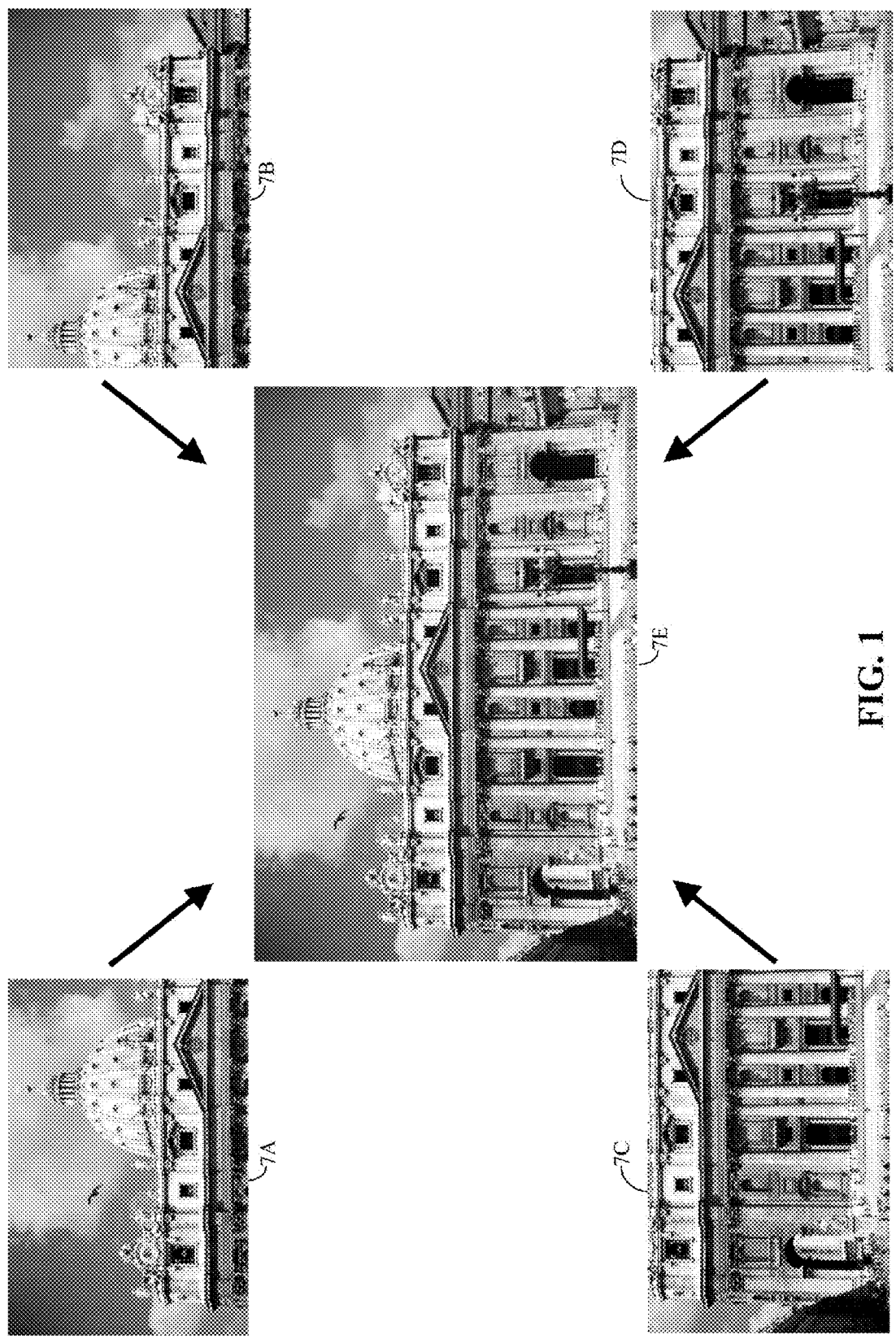
FIG. 1 illustrates the concept of image stitching, in general.
Figure 2:
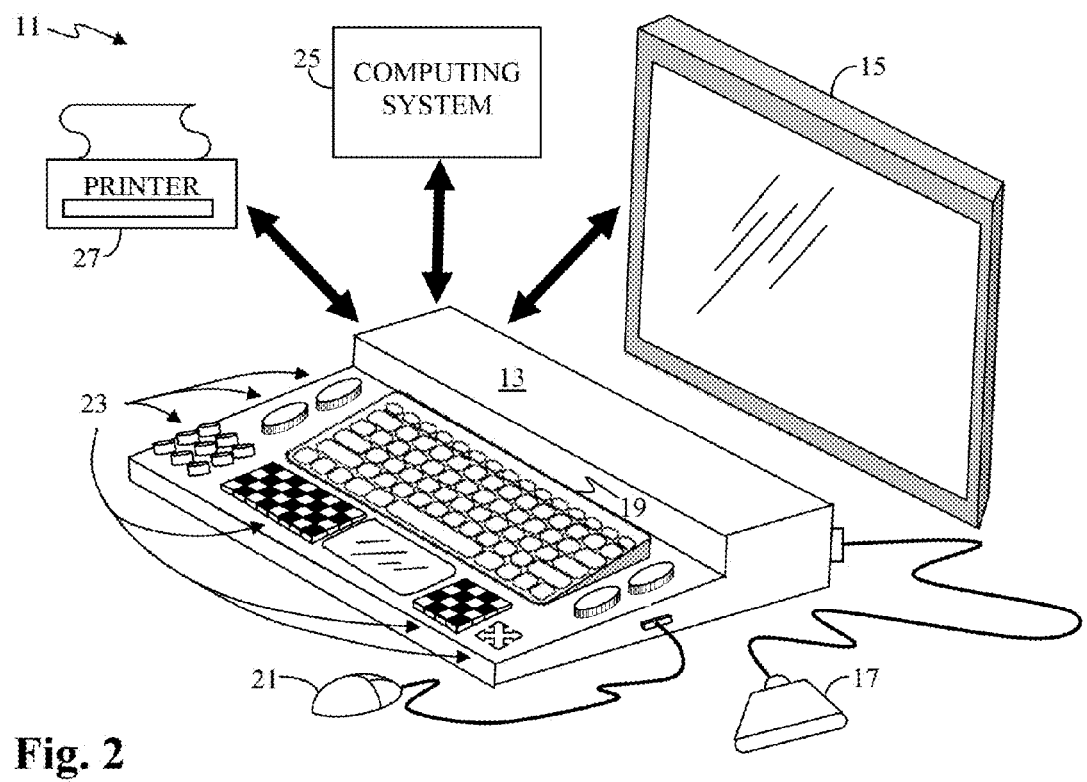
FIG. 2 illustrates a typical ultrasound imaging system.

With reference to FIG. 2, an ultrasound imaging system 11 typically includes a control panel 13 configured to receive user instructions and settings, a display device 15 and an ultrasound wand (or transducer) 17. Typically, one would add conductive jelly over a surface to be scanned, and ultrasound wand 17 would then be moved across the surface. As ultrasound wand 17 is moved, it sends and receives signals pulses (i.e. high frequency sound waves), and the information obtained by ultrasound wand 17 is sent to control panel 13 for processing, which produces an ultrasound image, such as ultrasound image 31 in FIG. 3, for example. Control panel 13 may be used to change the amplitude, frequency and duration of the pulses emitted from ultrasound wand 17.

Control panel 13 may be embodied by a computing system, and may therefore include a central processing unit (CPU), control circuitry, input/output interfaces, signal busses, volatile and non-volatile memories, data registers, application specific integrated circuits (ASICs), programmable circuitry (such as PLA, PLD, CPLD, FPGA, etc.), and other computer sub-components known in the art. Control panel 13 may include a keyboard 19, mouse/stylus 21, and/or other input means 23 to receive input data and setting parameters, such as measurement and display settings for the display 15.

Optionally, ultrasound imaging system 11 may include other remote (or local) computing systems 25 in communication with control panel 13. Computing system 25 may augment the data processing capabilities of control panel 13 and/or provide additional computing resources and/or provide access to various data libraries and/or provide additional display and communication capabilities. Ultrasound imaging system 11 may further include a printer 27, which may print images from display data or other information data.

Figure 3:
FIG. 3 provides an example of an ultrasound image.

An example of an ultrasound image 31 is provided in FIG. 3. An ultrasound image will typically look very dark and noisy, and have textual information 31 and/or graphical information 33. Typically, the actual ultrasound image information (i.e. the pictorial ultrasound information) is within a signal area 35 that is a fraction of the entire ultrasound image 31. In order to provide stitching of the signal areas 35 from multiple ultrasound images 31, it is advisable to extract the signal areas 35 from each of the multiple ultrasound images 31, and then to stitch together the extracted signal areas 35 rather than stitching the multiple ultrasound images 31, in their entirety.

Because ultrasound images are highly noisy, the application of image processing techniques is complicated, particularly in the field of image stitching. Earlier ultrasound image stitching methods have not taken into account the special properties of ultrasound images, and have often lead to misalignment or stitched images with blurry and ghost edges.

The present invention achieves reliable and effective stitching of ultrasound scans (i.e. ultrasound images comprised from a plurality of individual ultrasound scan lines). The present invention uses an intelligent weighting technique to achieve seamless stitching of a series of ultrasound slices (or swatches, i.e. ultrasound images produced by individual passes of an ultrasound scanning wand) that scan the same section plane with overlapping passes (i.e. the slices overlap each other). The preferred embodiment combines constraints from the spatial domain and the gradient domain, and further incorporates image statistics across the whole sequence of ultrasound images that are to be stitched. This approach greatly reduces visual artifacts such as blurry edges and ghost edges in the stitched ultrasound images.

Figure 4:
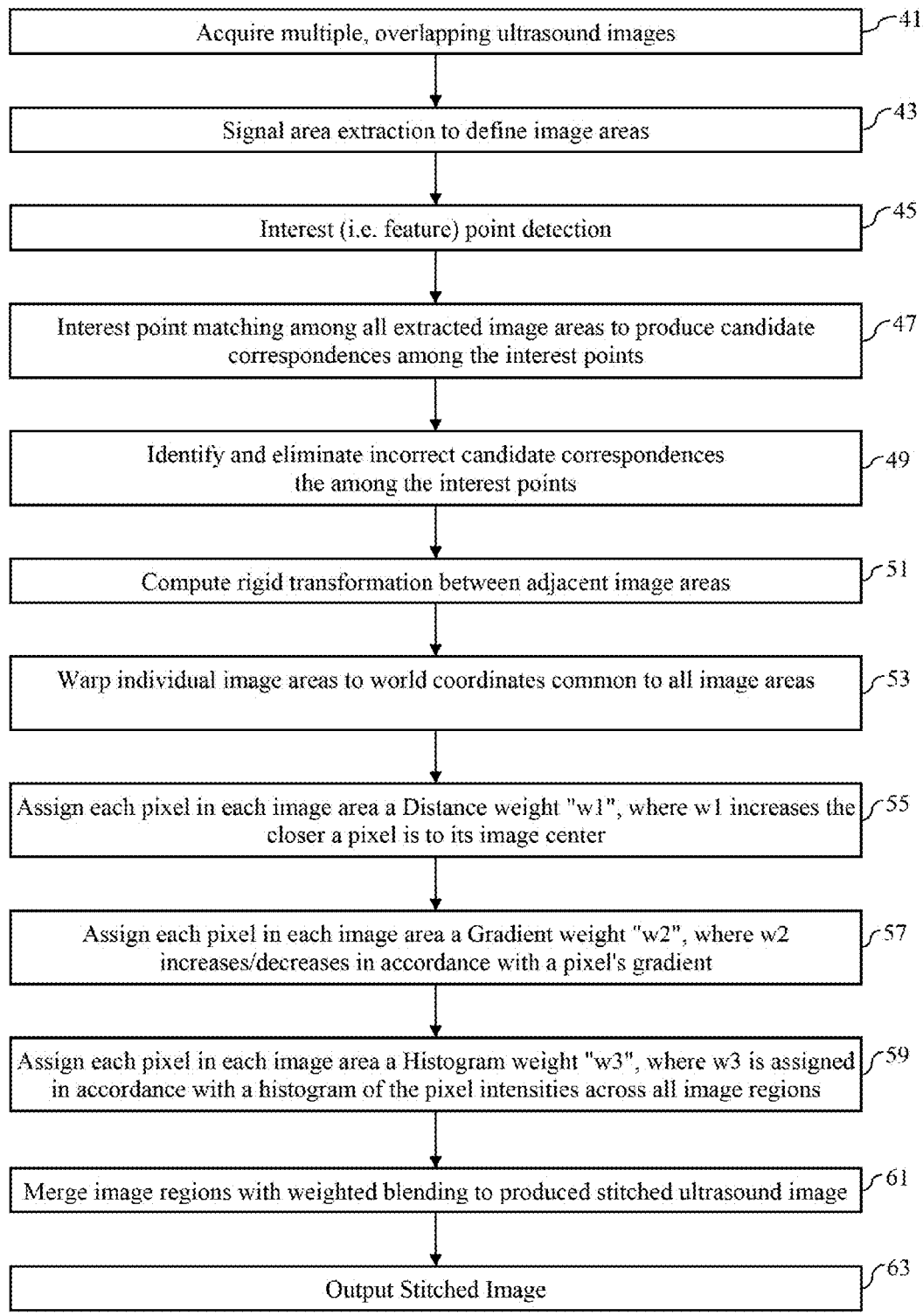
FIG. 4 provides an overview of a preferred embodiment of the present invention.
Figure 5:
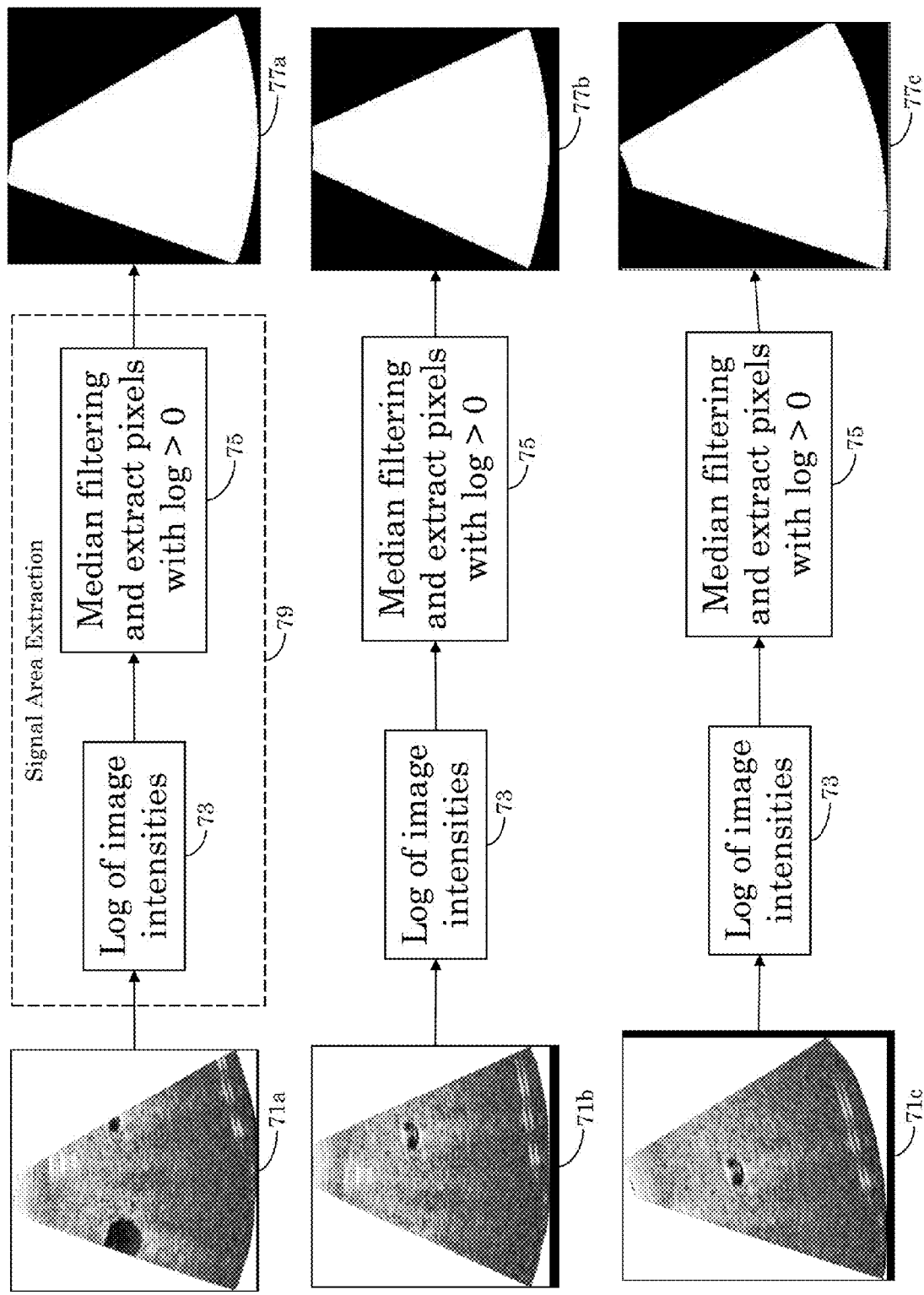
FIG. 5 shows examples of extracting signal areas for stitching from three sector-type ultrasound images
Figure 6:
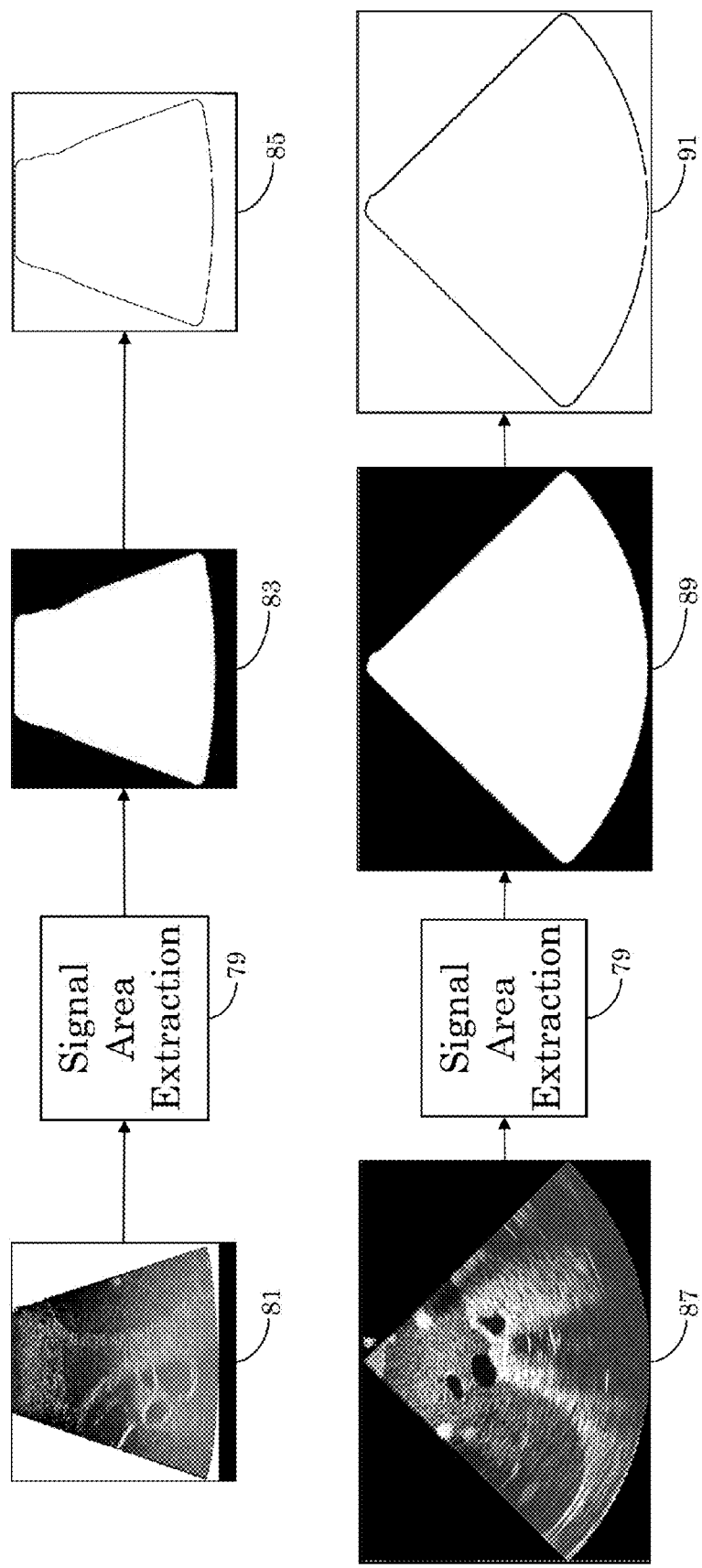
FIG. 6 shows two additional examples of sector-type ultrasound images.
Figure 7:
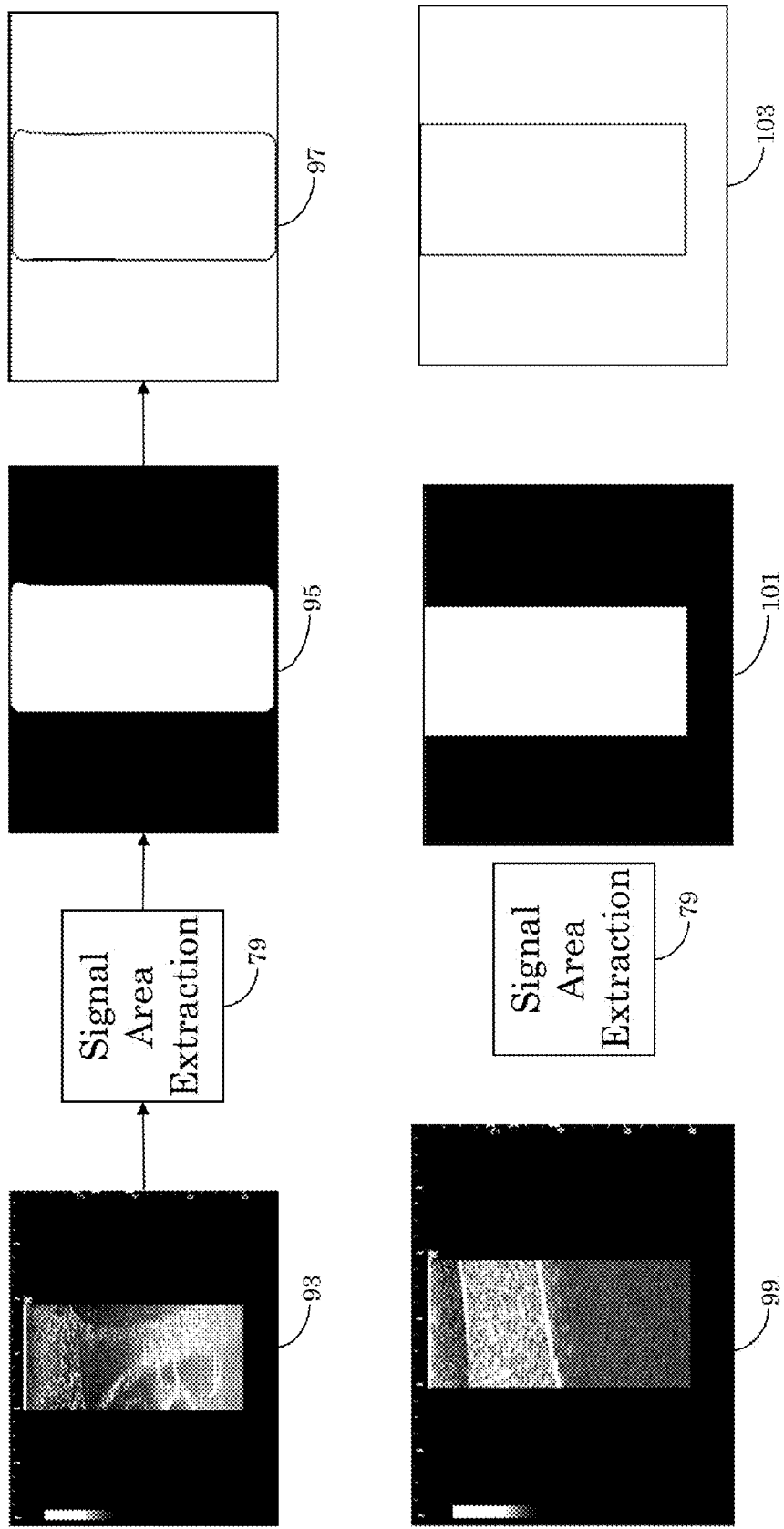
FIG. 7 illustrates two examples of signal area extraction from linear type ultrasound images.

With reference to FIG. 4, an overview of a preferred embodiment of the present invention begins by acquiring multiple, overlapping ultrasound images (step 41). Next, step 43 extracts from each ultrasound image the signal area that contains the ultrasound information in a pictorial form. These extracted signal areas define the images areas that are to be stitched together. FIGS. 5-7 provide some examples of signal area extraction from ultrasound images.

FIG. 5 shows examples of extracting signal areas for stitching from three sector-type ultrasound images 71a, 71b and 71c. Each ultrasound image 71a, 71b and 71c is submitted to a first processing module 73 that computes the log of image intensities, and the result is subjected to median filtering at module 75, which also extracts pixels with log>0. Together, modules 73 and 75 constitute a signal area extraction module 79. If necessary, signal area extraction module 79 may implement additional preprocessing to remove textual and graphical data that may surround the signal area of the ultrasound image. Signal area extraction module 79 effectively identifies for extraction the signal areas from each of ultrasound images 71a, 71b and 71c, as is illustrated by their respective output, processed images 77a, 77b and 77c.

As it is known in the art, sector-type ultrasound images may have different shapes defined by the equipment used to generate the ultrasound images. Two additional examples of sector-type ultrasound images are shown in FIG. 6. Ultrasound image 81 is submitted to signal area extraction module 79, which identifies/extracts the target signal area, shown as a white area in processed image 83. Image 85 provides an outline (or identifies the perimeter) of the extracted signal area. The perimeter may be used in determining a weighting component for pixels within the signal area, as is explained more fully below. Similarly, ultrasound image 87 is submitted to signal area extraction module 79, which identifies/extracts the target signal area, shown as a white area in processed image 89. Image 91 provides an outline (or identifies the perimeter) of the extracted signal area.

FIG. 7 illustrates two examples of signal area extraction from linear type ultrasound images. In the present case, linear-type ultrasound image 93 is submitted to signal area extraction module 79, which identifies/extracts the target signal area, shown as a white area in processed image 95. Image 97 provides an outline (or identifies the perimeter) of the extracted signal area. In the present example, image 97 provides a stitching data set, which may be defined as top=25 (the top of the image area is coincident with a horizontal line located at dot position 25), bottom=480 (the bottom of the image area is coincident with a horizontal line located dot position 480), left=30 (the left side of the image area is coincident with a vertical line located dot position 30), and right=655 (the left side of the image area is coincident with a vertical line located dot position 30). Similarly, linear-type ultrasound image 99 is submitted to signal area extraction module 79, which identifies/extracts the target signal area, shown as a white area in processed image 101. Image 103 provides an outline (or identifies the perimeter) of the extracted signal area. In the present example, image 101 provides a stitching (or segment) data set that may be defined as top=30, bottom=550, left=50, right=655.

Returning to FIG. 4, after extracting the ultrasound signal area (i.e. image area) for stitching, the next step 45 is to identify interest (i.e. feature) points in each of the extracted image areas. Step 47 then creates a candidate list of possible matching interest points (i.e. corresponding or indexed interest (or feature) points) among the multiple image areas. As is mentioned above, there are multiple known methods of characteristic feature identification and matching. As an example, FIGS. 8 through 13 illustrate the use of scale-invariant feature transform, SIFT for feature point identification and correspondence.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference.

Often, SIFT is used to identify a specific, target object in a test image, given a description of the target object provided as a database of feature points of the target object extracted from training images taken from different fields-of-views, FOVs, (i.e. from different view angles). In a typical SIFT object-identification application, feature points of the target objects are first extracted from a set of training images and stored in a database. The target object is recognized (i.e. identified) in a new image (i.e. a test image) by individually comparing each feature point extracted from the new image with the collection of feature points in the database, and finding candidate matching features based on Euclidean distance of their feature point vectors. From the full set of matches, subsets of feature points that agree on the target object and its location, scale, and orientation in the test image are identified to filter out good matches. Consistent clusters of good matches are then identified. Typically, each cluster of three or more features that agrees on the target object and its pose is then subjected to further detailed model verification, and subsequently, outliers are discarded. Finally the probability that a particular set of feature points indicates the presence of a target object is computed, given the accuracy of fit and number of probable false matches. Object matches that pass all these tests may then be identified as correct.

Figure 8:
FIG. 8 illustrates feature point extraction from a sample image.

An example of a SIFT determination of feature points in an image is illustrated in FIG. 8. Possible feature points are first identified, as indicated by dark dots in image 8A. Possible feature points that have a low contrast are then discarded, as illustrate in image 8B. Finally, possible features points located on edges are removed, which leaves the final set of feature points shown in image 8C.

Figure 9:
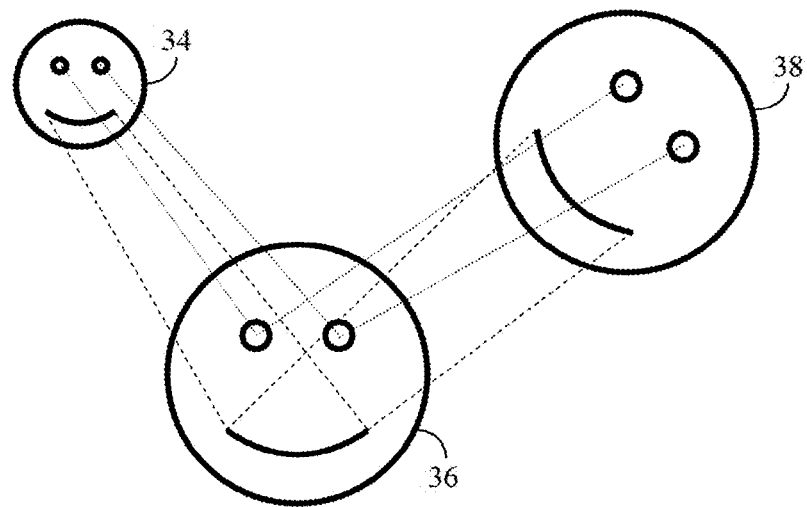
FIG. 9 illustrates the establishment of feature point correspondence using an SIFT transform.

Thus, SIFT permits one to match feature points of an identified object from one image to another. This is illustrated in FIG. 9, where three images of the same object, i.e. a happy face, are shown. For illustration purposes, only four feature points, corresponding to points near the eyes and the corners of the mouth, are shown. As indicated in FIG. 9, SIFT can match feature points from a first face 36 to a second face 34 irrespective of a change in scale. SIFT can also match feature points from first face 36 to a third face 38 irrespective of rotation. However, SIFT has been found to have limited immunity to affine transforms of images. That is, SIFT is limited to the amount of change in the view-angle an imaged object can undergo and still be identified.

A method that extends a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 10:
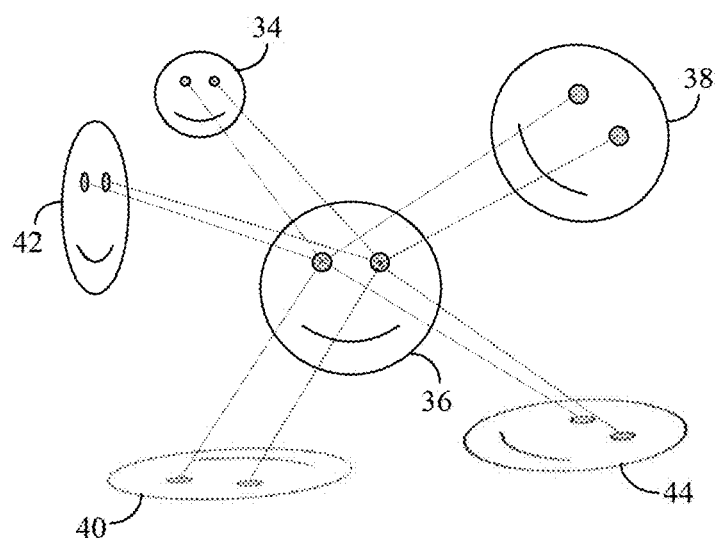
FIG. 10 illustrates the establishment of feature point correspondence using an ASIFT transform.

With reference to FIG. 10, an Affine SIFT would be better able to match feature points from first face 36, to representations of the same object that have undergone affine transformations, as illustrated by happy faces 40, 42 and 44.

Figure 11:
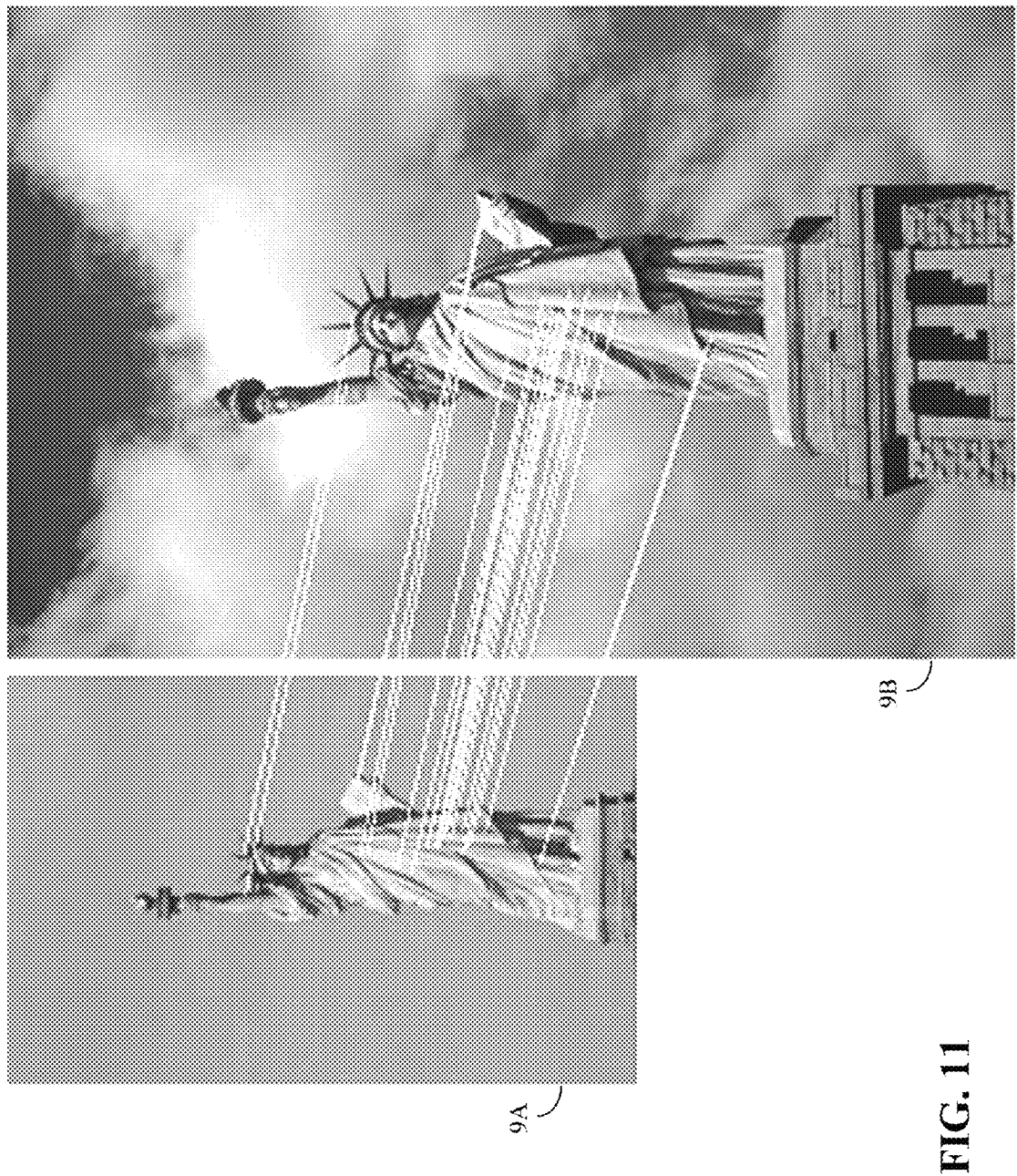
FIG. 11 is an example of feature point correspondence in two images of a common scene.

An example of an application of an Affine SIFT transform is illustrated in FIG. 11, where multiple feature points are matched from a first image 9A of the Statue of Liberty from a first view angle, to a second image 9B of the Statue of Liberty from a different view angle and at a different scale.

A quick overview of the feature point extraction function of a SIFT filter/algorithm/module/processor is illustrated in FIGS. 12 and 13. With reference to FIG. 12, each extracted feature point ID_1 (such as those illustrated in FIG. 8-11) is described by a series of metrics falling to several categories, i.e. distinguishing characteristics, within a window, Window_1. The center point (or center pixel) within a window may be identified as the feature point for that window. If desired, each feature point is assigned an identification code, ID, for quick reference. For example feature point ID1_1 may identify the feature point as being feature point number "1" extracted from image "ID1".

The metrics in each category constitute a histogram, and thus multiple histograms are created for each feature window. Consequently, a typical SIFT processing algorithm creates a series, or set, of SIFT histograms 66, and each set of histograms collectively describes an individual item descriptor (or feature point or SIFT descriptor). Each of SIFT histograms statistically describes a distinguishing characteristic of the feature point relative to its neighborhood of pixels (or pixel window) surrounding the feature point (or item descriptor) in the image being processed.

The series of SIFT histograms 66 are then collected (or otherwise combined) into single vector 68, which defines one feature point. That is, each vector 68 provides sufficient data to identifying an individual pixel (or feature point) within an image. Therefore, each vector 68 describes a single item descriptor (i.e., a feature point or characteristic feature or (feature) pixel) and consists of 128 pieces of descriptive data. Thus, each feature point is characterized (i.e., described or identified) by a 128-dimensioned vector 68.

FIG. 13 illustrates multiple sets of feature points extracted from n images, where the images are identified as ID1 through IDn. Each image is shown to have a set of feature points (illustrated as circles) individually identified. For example, i feature points are extracted from image ID1, and they are labeled ID1_1 through ID1_i. Similarly, p feature points are extracted from image IDn, and they are labeled IDn_1 through IDn_i. Each feature point is a 128-dimension vector (i.e. a vector with 128 data cells). The extracted feature points form one image and may then be matched to (i.e. compared to find a match with) extracted feature points from other images.

Figure 14:
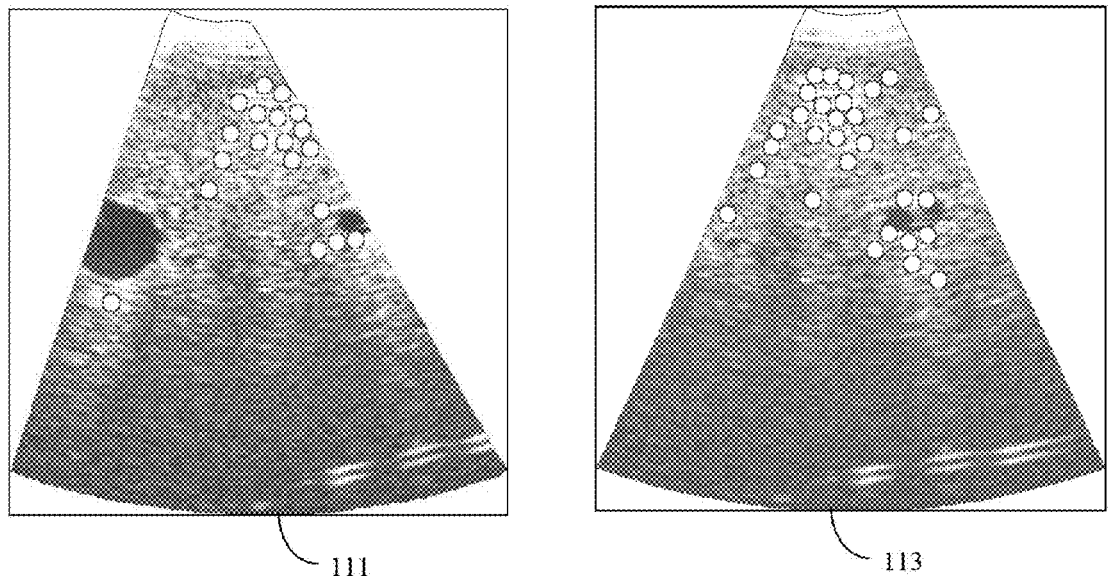
FIG. 14 illustrates identified feature points in a first extracted image area 111 of a first ultrasound image and a second extracted image area 113 of a second ultrasound image.

FIG. 14 illustrates the identification of feature points in a first extracted image area 111 of a first ultrasound image and a second extracted image area 113 of a second ultrasound image. The presently preferred embodiment uses Harris corner detection to identify interest points. It is further preferred that local density suppression based on distance be used.

Figure 15:
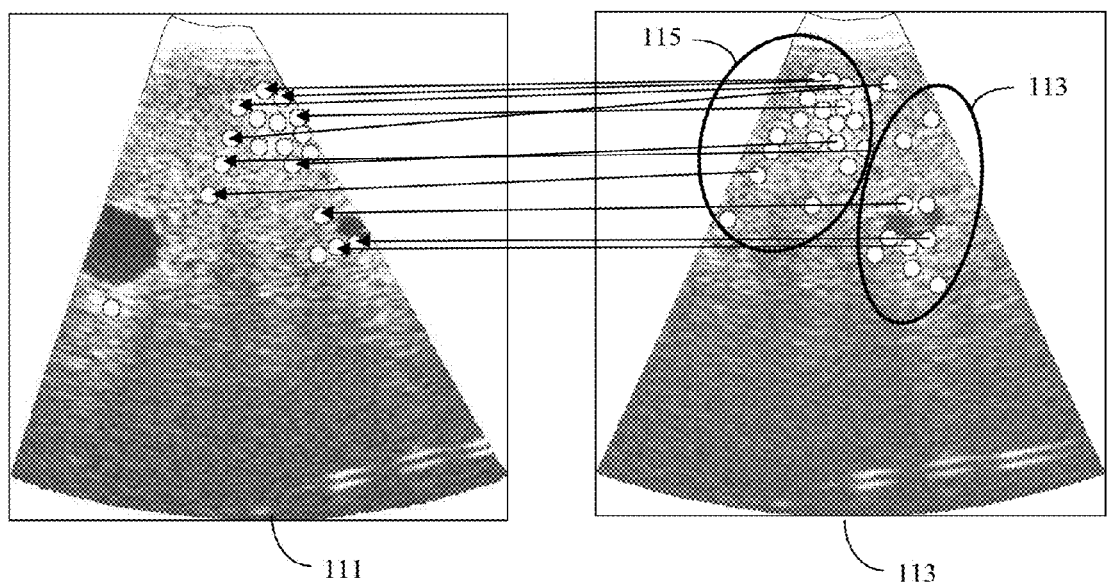
FIG. 15 illustrates interest point matching among the identified interest points of multiple image regions.

FIG. 15 illustrates interest point matching among the identified interest points of multiple image regions. That is, candidate correspondences of interest points between each pair of neighboring images is conducted. Preferably, candidate correspondences are found by rotation-invariant template matching. As shown, only some of the interest points in each image area are matched (i.e. identified to correspond to, or are registered to) other interest points in another image area. In FIG. 15, corresponding interest points are identified by arrows leading from one interest point in one image area to it's corresponding interest in another interest area.

Returning to FIG. 4, following the creation of candidate correspondence between interest points, the next step is identify and eliminate incorrect candidate correspondences (step 49). In FIG. 15, candidate correspondences that are a correct match are identified by oval 115, and candidate correspondences that are incorrectly matched are encircled by oval 117. Preferably, incorrectly matched interest points are identified by rejected by the RANSAC (i.e. RANdom SAmple Consensus) algorithm, known in the art.

Figure 16:
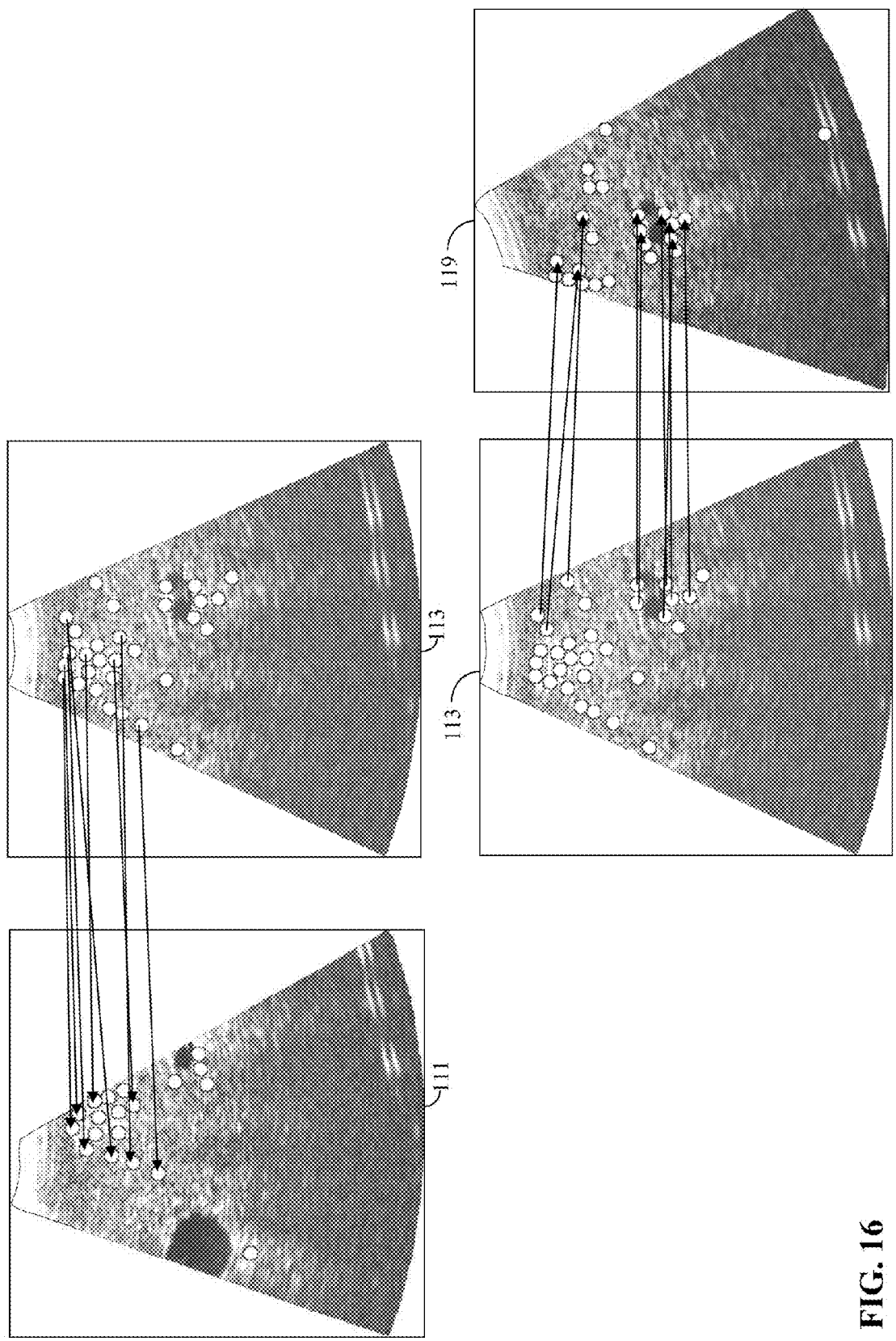
FIG. 16 illustrates interest point correspondences between three extracted image areas.

FIG. 16 illustrates a set of final interest point correspondences (i.e. after incorrect matching in candidate correspondences have been rejected) between first input extracted image area 111 and second extracted image area 113, also between second extracted image area 113 and a third extracted image area 119 from a third ultrasound image.

As illustrated in step 51 of FIG. 4, a rigid transformation between adjacent image areas is computed after the incorrect correspondences have been identified and rejected. First, the geometric transformations between each pair of neighboring images is computed based on the matched interest points.

In step 53, the individual image areas are then warped into a world coordinate system common to all image areas. FIG. 17 illustrates the rigid transformation between adjacent image areas. Individual first, second and third image areas 111, 113 and 119 are shown prior to the rigid transformation. The correspondingly transformed images 111T, 113T and 119 after the rigid transformation is also shown. That is, image 111T corresponds to first image are 111T after it has been warped to the common world coordinate, image 113T corresponds to second image are 113T after it has been warped to the common world coordinate, and image 119T corresponds to third image are 119T after it has been warped to the common world coordinate.

Steps 55-59 then assign three different weights to each pixel of each image region after it has been warped to the common world coordinate. Step 55 assign each pixel in each image area a Distance weight "w1", where w1 increases the closer a pixel is to its image area center.

FIG. 18 illustrates a Distance weight distribution 123 of Distance weights w1 determined for an input image 121, where for ease of illustration purposes, a higher brightness value is used to represent a higher Distance weight w1. As illustrated in FIGS. 5-7, the perimeter of the extracted image regions may constitute a mask for the extracted image area. The Distance weight w1 may be determined by setting the pixels in the mask to 0 and setting the pixels outside the mask to 1. The Euclidean distance between a current pixel and the nearest nonzero pixel of the binary image is then computed. In this manner, the pixels closer to the center of the mask have larger distance to the nearest nonzero pixels, and these distances may be used as weights.

Step 57 assign each pixel in each image area a Gradient weight "w2", where w2 increases/decreases in accordance with a pixel's gradient. As it is known in the art, a pixel's gradient is a measure of the relative difference between the brightness of neighboring pixels. Many methods of calculating a pixel's gradient are known in the art, and the specific method used is not critical to the present invention.

FIG. 19 illustrates a gradient weight distribution 125 of Gradient weights w2 determined for input image 121, where for ease of illustration purposes, a higher brightness value is used to represent a higher Gradient weight w2. Preferably the image gradient magnitude is computed such that the bigger the gradient, the higher the Gradient weight it is assigned. Preferably, grayscale dilation (dilate with local maximum) is performed on the gradient image to obtain smoother weights. Further preferably, gradients close to borders of the signal area (i.e. the mask) are discarded.

Step 59 assigns each pixel in each image area a Histogram weight "w3", where w3 is assigned in accordance with a histogram of the pixel intensities across all image areas. FIG. 20 illustrates a Histogram weight distribution 127 of Histogram weights w3 determined for input image 121, where for ease of illustration purposes, a higher brightness value is used to represent a higher Gradient weight w3. Preferably, the Histogram weight w3 is computed for each image pixel across all input image regions. The pixels whose intensities have higher counts in the histogram are assigned higher Histogram weights. Further preferably, for each pixel in the stitched image, the normalized intensity histogram of its corresponding pixels across all input images is computed. The weight of this pixel in each input image is then decided by the count of its intensity in the histogram.

As shown in FIG. 4, step 61 then merges the image regions with weighted blending to produce stitched ultrasound image. Multiple methods of blending are known in the, and the specific method used is not critical to the invention. For example, a simple blending may involve averaging pixel values. A distinction of the present invention, however, is that the blending is accomplished by the normalized combination of the above-described three pixel weights. In step 63, the final stitched image is output.

FIG. 21 illustrates an example 129 of the combining of the three weights for input image 121. Thus, the blending function is computed by combing distance, gradient and intensity statistics. In summary, across each image, each type of weights is normalized to 0~1, so they can be directly combined at each pixel. That is, if the normalized Distance w1 is termed "Norm(w1), and the normalized Gradient weight w2 is termed "Norm(2), and the normalized Histogram weight w3 is termed "Norm(w3), then the final weight "w" for each pixel for the blending function may be defined as w=Norm(w1)+Norm(w2)+2*Norm(w3). Further preferably, for each pixel in the final stitched image, the combined weight is normalized so that its sum across all the input images is 1. This avoids intensity overflow.

Figure 22:
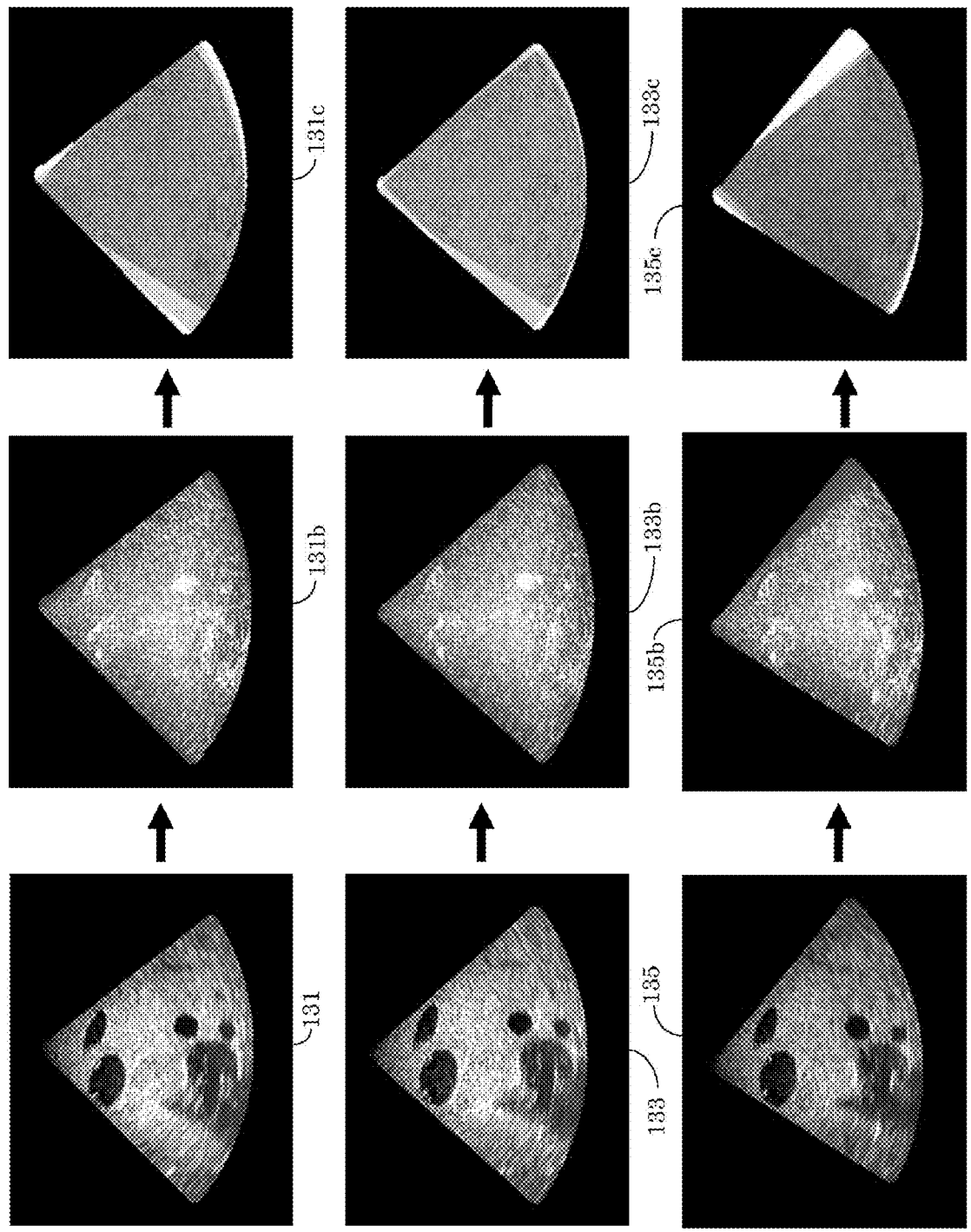
FIG. 22 shows an example of blending three images.

FIG. 22 shows an example of blending three images. The three weights w1, w2 and w3 are determined for three warped image regions 131, 135, and 137. The weights for the warped images 131, 135, and 137 are then combined resulting in corresponding combined-weight images 131*b*, 135*b* and 137*b*. The combined weights of images 131*b*, 133*b* and 135*b* are then normalized resulting in corresponding normalized-weight images 131*c*, 135*c* and 135*c*.

For illustration purposes, FIGS. 23-26 compare the results of stitching multiple images using the present three-weight, blending process versus the stitching of image single a single distance weight. For example, FIG. 23 compares the stitching of three image regions using only a distance weight (image 141*a*) versus using the normalized three weights of the present invention (image 141*b*).

FIG. 24 compares the stitching of six image regions using only a distance weight (image 143*a*) versus using the normalized three weights of the present invention (image 143*b*).

FIG. 25 compares the stitching of nineteen image regions using only a distance weight (image 145*a*) versus using the normalized three weights of the present invention (image 145*b*).

FIG. 26 compares the stitching of seventy-two image regions using only a distance weight (image 147*a*) versus using the normalized three weights of the present invention (image 147*b*).

As is illustrated in FIGS. 23-26 the use of present, normalized three-weight blending method for stitching results in clearer images.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of stitching together a respective image region from each of a plurality of input images, comprising:
    detecting feature points in each image region, and identify candidate corresponding feature points among the image regions, reject incorrect correspondences among the candidate corresponding feature points to define corresponding features points;
    warping the corresponding feature points onto a defined world coordinates spanning the image regions;
    For each of said image regions,
        (a) defining a first weight, i.e. w1, as a "distance weight" wherein each pixel is assigned a distance weight dependent upon its proximity to an edge of its respective image region;
        (b) defining a second weight, i.e. w2, as a "gradient weight" wherein pixels having a higher gradient, i.e. difference in intensity value as compared to neighboring pixels, receiving a higher weight value;
        (c) defining a third weight, i.e. w3, as a "histogram weight" of the intensity of each pixel across all image regions,
    stitching the respective image regions by a blending function applied to overlapping areas of the image regions, wherein in said blending function, across each image region to be stitched, its three weights are normalized to weight values from 0 to 1, to define a first normalized weight, i.e. Norm(1), a second normalized weight, i.e. Norm(w2) and a third normalized weight, i.e. Norm(w3), and overlapping regions are combined by the following relationship: w=Norm(w1)+Norm(w2)+2*Norm(w3).

2. The method of claim 1, wherein only one image region from each respective input image is extracted, each image region being a fraction of its respective input image.

3. The method of claim 2, wherein said input images are constructed by an ultrasound imaging means and the image region within each input image define an ultrasound constructed image.

4. The method of claim 3, wherein within each input image, its corresponding image region is extracted by identifying corners defining the image region.

5. The method of claim 3, wherein said input images are at least three input image images.

6. The method of claim 1, wherein in determining said first weight, pixels closer to the center of their respective image region receive higher weights than pixels more distant from said center.

7. The method of claim 1, wherein defining said third weight includes, defining a normalized intensity histogram of the corresponding pixels in all image regions, and determining the third weight value of each pixel based on the count of its intensity in the histogram.

8. The method of claim 1, wherein the candidate corresponding feature points are identified by rotation-invariant template matching.

9. The method of claim 1, wherein incorrect correspondences among the candidate corresponding feature points are identified by means of a RANSAC algorithm.

\* \* \* \* \*